United States Patent [19]

Dauson

[11] 4,394,064

[45] Jul. 19, 1983

[54] DURABLE CERAMIC ENAMEL SPANDRELS

[75] Inventor: Samuel Dauson, Pittsburgh, Pa.

[73] Assignee: PPG Industries, Inc., Pittsburgh, Pa.

[21] Appl. No.: 278,957

[22] Filed: Jun. 30, 1981

[51] Int. Cl.³ .................. G02B 17/00; G02B 27/00
[52] U.S. Cl. .................................. 350/259; 350/264
[58] Field of Search ............. 350/259, 258, 260–265, 350/281, 280

[56] References Cited

U.S. PATENT DOCUMENTS 3,869,198 3/1975 Ballentine .................. 350/259
3,951,525 4/1976 Ballentine .................. 350/259

Primary Examiner—Richard A. Wintercorn
Attorney, Agent, or Firm—Donna L. Seidel

[57] ABSTRACT

A durable spandrel panel comprising a colored ceramic enamel coating protected by a transparent metal oxide film is disclosed, wherein the dominant wavelength of light reflected by the colored ceramic enamel coating is not equivalent to the dominant wavelength of light transmitted by said transparent metal oxide film.

6 Claims, No Drawings

DURABLE CERAMIC ENAMEL SPANDRELS

BACKGROUND OF THE INVENTION

Curtainwall architecture comprises both vision areas and opaque areas referred to as spandrels. Spandrel areas are formed by panels which are either intrinsically opaque or made opaque by the inclusion of an opaque coating or backing material. Spandrel panels are generally employed to conceal portions of the structure of a building which are not aesthetically pleasing if visible from the exterior of the building. For example, spandrel panels may be used to conceal floor slabs, air conditioning equipment, heating ducts and so on. Spandrel panels may also be used to maintain privacy or security, e.g. at the ground level of a building.

A variety of spandrel panels that closely match or pleasingly contrast in color and reflectivity with adjacent transparent glass panels in curtainwall construction have been developed. Increasing use of highly reflective transparent metal and metal oxide coatings has led to the development of matching spandrel panels. U.S. Pat. No. 3,869,198 discloses spandrel panels provided with a transparent light and heat reflective coating on the outwardly glazed glass surface and a substantially opaque ceramic enamel coating adhered to the inwardly glazed glass surface. These spandrels provide for aesthetically matched vision and spandrel areas in curtainwall construction by utilizing a ceramic enamel coating which reflects light in the same spectral region as the light transmitted by the transparent coating and glass combination. U.S. Pat. No. 3,951,525 discloses spandrel panels with transparent light and heat reflective coatings on the inwardly glazed glass surface and with substantially opaque ceramic enamel coatings adhered to the transparent light and heat reflective coatings. The spandrels are aesthetically matched to vision areas in curtainwall construction by utilizing a ceramic enamel coating which reflects light in the same spectral region as light transmitted by the transparent coating.

In some architectural installations it is desirable to have a spandrel panel which has a different surface appearance from the high reflectivity of a metal or metal oxide coating or the glossiness of glass.

SUMMARY OF THE INVENTION

The present invention provides a durable spandrel panel comprising a rigid panel substrate, a ceramic enamel coating of a desired color, and a transparent protective metal oxide overcoating. In some applications, the substrate is preferably transparent, so that the color of the ceramic enamel coating is visible from both the exterior and the interior of the building. Glass is a particularly desirable substrate.

DESCRIPTION OF THE PREFERRED EMBODIMENTS

Preferred spandrels in accordance with the present invention comprise a rigid panel coated with a colored ceramic enamel frit which is overcoated with a transparent metal oxide film. The panel substrate may be any suitable rigid material, but is preferably glass. Typical soda-lime-silica glasses are preferred. However, tinted glasses may also be employed, such as the heat-absorbing glasses sold under the trademarks SOLEX, SOLARBRONZE and SOLARGRAY, the latter two being described in U.S. Pat. No. 3,296,004 and U.S. Pat. No. Re. 25,312 respectively.

In accordance with a preferred embodiment of the present invention, flat glass sheets supported on a horizontal conveyor are moved through a series of operations. First the glass sheets may be moved through a washer where detergent solutions and rotating brushes may be used to remove any dirt from the surface of the glass sheets, which are then dried with air. Next the glass is conveyed through a coating booth wherein a ceramic enamel coating composition is applied to the glass surface. The ceramic coating composition may be applied by conventional wet spray, electrostatic wet spray, automatic flow coating or electrostatic powder deposition techniques. The ceramic coating composition is preferably applied in a liquid vehicle, preferably an aqueous suspension. The glass is then conveyed through a furnace where the temperature is closely controlled to volatilize the liquid vehicle and then melt the ceramic coating material and bond it to the glass. The ceramic enamel coated glass is then contacted with an organometallic composition at a sufficient temperature to thermally decompose the organometallic coating reactant to form a metal oxide film on the ceramic enamel surface. Finally, the metal oxide coated ceramic enamel panel is conveyed through a cooling section for tempering or annealing of the glass substrate.

The ceramic enamel coating composition may be a ceramic frit such as lead borosilicate. Typical constituents in the ceramic enamels employed in the opaque coatings for the spandrels of the present invention include alumina, silica, boric oxide, lead oxide, potassia and soda. The ceramic enamels may also include calcium oxide, barium oxide, zinc oxide, magnesium oxide, strontium oxide, and the like. Other constituents which may be present in the ceramic enamel to impart color or opacity to the ceramic enamel include titanium oxide, cobalt oxide, manganese oxide, chromium oxide, copper oxide, iron chromate, potassium dichromate, lead chromate and so on. Typical coloring pigments for particular color components are cadmium sulfoselenide for red; cadmium sulfide for yellow; cobalt oxide for blue; chromium oxide for green; cobalt, chromium and ferric oxides for black; and titanium oxide for white. Suitable ceramic enamel compositions are available in a variety of colors from commercial suppliers such as O. Hummel of Carnegie, Pa. or Drakenfield of Washington, Pa.

The colored opaque ceramic enamel frit is preferably applied in aqueous suspension. The liquid vehicle preferably comprises water, alcohol, diethylene glycol (a thickening agent), sodium nitrite (a suspension agent), and sodium pyrophosphate (a dispersion agent). Minor amounts of octyl alcohol may be added to reduce foaming of the composition. Other possible additives include citric acid to reduce the viscosity of the suspension or methylcellulose to increase the viscosity of the suspension. Typical ceramic enamel coating compositions may comprise 30 to 70 milliliters of water, 70 to 27 milliliters of methylalcohol, 2 to 10 percent by volume of diethylene glycol, 0.09 to 12 percent by weight (of solids) of sodium nitrite, 0.05 to 0.11 percent by weight (of solids) of sodium pyrophosphate, and 150 to 250 grams of the ceramic enamel coloring frit. The ceramic enamel coloring compositions of the present invention may be formulated by ball milling the colorants to a particle size of less than about 200 mesh and then introducing the particles into the liquid vehicle.

Opaque ceramic enamel coatings in a wide variety of desirable colors may be prepared in accordance with the present invention. Particularly preferred colors include a brown having a dominant wavelength of 620 nanometers at an excitation purity of 12 percent, a gold having a dominant wavelength of 576 nanometers at an excitation purity of 23 percent, a bronze having a dominant wavelength of 478 nanometers at an excitation purity of 7 percent, a tan having a dominant wavelength of 578 nanometers at an excitation purity of 16 percent, a gray having a dominant wavelength of 487 nanometers at an excitation purity of 3.5 percent, a green having a dominant wavelength of 483 nanometers at an excitation purity of 10 percent, an ebony having a dominant wavelength of 478 nanometers at an excitation purity of 10 percent and a silver pearl having a dominant wavelength of 486 nanometers at an excitation purity of 2 percent.

The ceramic enamel frit is preferably applied to a glass substrate at room temperature and subsequently fired to evaporate the liquid vehicle and bond the coating to the substrate. The fired ceramic enamel frit has desirable color and reflectance properties, but is generally not sufficiently durable to be the exposed surface of an architectural installation. Therefore, in accordance with the present invention, the ceramic enamel is overcoated with a metal oxide film which is more resistant to abrasion and weathering. A preferred metal oxide coating for this purpose is tin oxide. The protective metal oxide film is transparent and preferably essentially colorless in order to preserve the color of the opaque ceramic enamel.

In a preferred embodiment of the present invention, the ceramic enamel frit is overcoated with a metal oxide film by a pyrolytic technique, such as those described in U.S. Pat. Nos. 3,107,177; 3,185,586; 3,660,061 and 4,263,335. The ceramic enamel coated panel is contacted with an organometallic coating reactant capable of thermal decomposition to a metal oxide at a sufficiently high temperature to effect decomposition of the organometallic coating reactant to form a metal oxide film over the ceramic enamel coating. The metal oxide film is preferably transparent and colorless. A variety of metal oxides may be used, but tin oxide is preferred for its superior durability. The film thickness is sufficient to provide protection of the ceramic enamel without exhibiting an interference color. When tin oxide is used as the protective coating, a film thickness having a resistivity less than about 3000 ohms per square at the perimeter of the coated article, preferably less than 500 ohms per square, and most preferably 200 to 400 ohms per square at the center of the coated article, is preferred. A film in this thickness range provides substantial protection to the ceramic enamel frit without exhibiting an interference color.

While annealed coated products may be useful in some applications, the preferred product in accordance with the present invention is at least partially tempered. In a most preferred embodiment, a glass substrate is coated with a ceramic enamel frit composition, fired to fuse the ceramic, contacted with a thermally decomposable organometallic compound to pyrolytically deposit a metal oxide film, and then quenched to obtain a semi-tempered state.

The present invention will be more fully understood from the descriptions of specific examples which follow.

EXAMPLE I

A glass substrate is coated with a gray ceramic enamel frit which is fired at a temperature of about 1100° F. (about 593° C.) for about 4 to 5 minutes in air. The ceramic enamel coated panel is then contacted with a solution of dibutyltin difluoride at a temperature of about 1050° F. (about 566° C.), whereupon the reactant decomposes to form a tin oxide film on the ceramic surface. The transparent, colorless tin oxide film exhibits a surface resistivity in the range of 300 to 500 ohms per square. The coating is hard, chemically durable and suitable for first surface glazing. Durability of this sample is then compared with the durability of a sample which differs only in the absence of the protective tin oxide coating in a variety of tests with the following results. After 1100 hours of exposure in a Weather-O-Meter, the product of the present invention shows no visible change, whereas the unprotected ceramic enamel coated panel shows light iridescence. After immersion in 20 percent sodium hydroxide solution at 200° F. (about 93° C.) for 30 minutes, the product of the invention shows no visible change, whereas the unprotected ceramic enamel coated panel shows heavy fading. Upon immersion in 10 Normal sulfuric acid at 125° F. (about 52° C.) for 30 minutes, the product of the invention shows no visible change, whereas the unprotected ceramic enamel coated panel shows light fading. Immersion in concentrated hydrochloric acid at 100° F. (about 38° C.) for 30 minutes results in no visible change for the product of this example, in comparison with light iridescence of the ceramic enamel coated panel without a tin oxide overcoating.

EXAMPLE II

To evaluate the importance of the tin oxide coating thickness, three samples are prepared having a gray-black colored ceramic enamel coating on glass. The first is not coated with tin oxide, the second is coated with tin oxide to a thickness having a surface resistivity of 1000 to 1700 ohms per square, and the third sample is overcoated with a tin oxide film having a surface resistivity of 100 to 150 ohms per square. After 90 days exposure in a 5% salt spray test, the unprotected ceramic enamel shows heavy iridescence, while the thin tin oxide coated sample has slight scumming and the thicker tin oxide coated sample shows no visible change. After 1130 hours exposure in a Weather-O-Meter, both tin oxide coated samples show no visible change, whereas the gray-black ceramic enamel exhibits moderate iridescence. In the sodium hydroxide immersion test, the unprotected gray-black ceramic enamel undergoes heavy fading, the light tin oxide coated sample undergoes light fading, and the thicker tin oxide coated sample of the present invention shows no visible change. In the sulfuric acid immersion test, both tin oxide coated samples show no visible change, whereas the unprotected gray-black ceramic enamel develops heavy iridescence. In the hydrochloric acid immersion test, likewise, the two tin oxide coated samples show no visible change, whereas the unprotected gray-black ceramic enamel develops heavy iridescence.

EXAMPLE III

A glass panel is coated with a brown colored ceramic enamel, fired, and overcoated with a tin oxide film to a thickness exhibiting a surface resistivity of 55 to 80 ohms per square. The ceramic enamel protected with tin oxide in accordance with the present invention shows no visible change after 90 days exposure in a 5% salt spray test, compared with moderate iridescence for an unprotected brown ceramic enamel. After 1330 hours exposure in a Weather-O-Meter, the tin oxide coated brown ceramic enamel panel shows no visible change, whereas the unprotected enamel exhibits moderate iridescence. In the sodium hydroxide immersion test, the tin oxide coated brown ceramic enamel spandrel shows no visible change, whereas the unprotected brown ceramic enamel exhibits heavy fading. In the sulfuric acid immersion test, the tin oxide coated brown ceramic enamel shows no visible change, whereas the unprotected ceramic enamel undergoes light fading. In the hydrochloric acid immersion test, the brown ceramic enamel protected with the tin oxide film shows no visible change, whereas the unprotected enamel exhibits light iridescence.

EXAMPLE IV

In addition to the aforementioned tests, chemical rundown tests are performed on the tin oxide coated ceramic enamel panels of the above examples of the present invention. The results are compared with test results for unprotected ceramic coatings. Chemical solutions are allowed to run down over the coated surfaces of the panels, which are at a temperature of 180° F. (about 82° C.). In tests with muriatic acid, the unprotected enamels exhibit heavy iridescence, whereas the tin oxide coated enamels show no visible change. In a test with 0.5% hydrofluoric acid, the unprotected enamels exhibit considerable etching, whereas the tin oxide coated enamels show only very faint spots. In a test with 2% sodium hydroxide solution, the unprotected enamels exhibit iridescence, whereas the tin oxide coated enamels show no visible change.

The above examples are offered to illustrate the present invention. A wide variety of colored ceramic enamels may be employed in accordance with the present invention. Although tin oxide is preferred for its durability, transparency and colorlessness, other metal oxides may be used as protective coatings, and other coating techniques may be utilized. When tin oxide is used, the preferred thickness may vary depending on the composition of the ceramic enamel frit. Substrates other than the glass which is described in the examples of the present invention may be used. The scope of the present invention is defined by the following claims.

I claim:

1. An article for use in curtainwall construction comprising:
   a. a rigid panel substrate;
   b. an opaque colored ceramic enamel coating fired on said substrate; and
   c. a transparent, colorless, protective metal oxide film deposited over said ceramic enamel coating, wherein the dominant wavelength of light reflected by said opaque ceramic enamel coating is not equivalent to the dominant wavelength of light transmitted by said transparent film.

2. An article according to claim 1, wherein the substrate is glass.

3. An article according to claim 1, wherein the metal oxide coating is colorless.

4. An article according to claim 3, wherein said colorless transparent metal oxide film comprises tin oxide.

5. An article for use in curtainwall construction comprising:
   a. a glass substrate;
   b. an opaque colored ceramic enamel coating fired on said substrate; and
   c. a transparent, colorless, protective tin oxide film deposited over said ceramic enamel coating, wherein the dominant wavelength of light reflected by said opaque ceramic enamel coating is not equivalent to the dominant wavelength of light transmitted by said transparent film, and wherein the tin oxide is deposited by thermal decomposition of an organotin compound.

6. An article according to claim 5, wherein the tin oxide film exhibits a surface resistivity less than about 3000 ohms per square.

* * * * *